(12) United States Patent
Ryo

(10) Patent No.: US 11,893,202 B2
(45) Date of Patent: Feb. 6, 2024

(54) INFORMATION PROCESSING DEVICE, PROCESSING METHOD, AND RECORDING MEDIUM

(71) Applicant: NEC CORPORATION, Tokyo (JP)

(72) Inventor: Sho Ryo, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/841,959

(22) Filed: Jun. 16, 2022

(65) Prior Publication Data
US 2022/0308710 A1    Sep. 29, 2022

Related U.S. Application Data

(63) Continuation of application No. 16/414,305, filed on May 16, 2019, now Pat. No. 11,392,259, which is a
(Continued)

(30) Foreign Application Priority Data

Mar. 2, 2012    (JP) ................. 2012-047248

(51) Int. Cl.
*G06F 3/0481*    (2022.01)
*G06F 1/3218*    (2019.01)
(Continued)

(52) U.S. Cl.
CPC .......... *G06F 3/0481* (2013.01); *G06F 1/1626* (2013.01); *G06F 1/3215* (2013.01);
(Continued)

(58) Field of Classification Search
CPC .............. H04W 52/0254; G06F 1/3228; G06F 1/3231; G06F 3/0481; G06F 3/0488;
(Continued)

(56) References Cited

U.S. PATENT DOCUMENTS 8,937,629 B2    1/2015    Takishita
9,608,992 B2    3/2017    Takishita
(Continued)

FOREIGN PATENT DOCUMENTS

EP    2637471 A1    9/2013
JP    07-013696    1/1995
(Continued)

OTHER PUBLICATIONS

Japanese Office Action for JP Application No. 2020-185598 dated Jun. 14, 2022 with English Translation.
(Continued)

*Primary Examiner* — Pei Yong Weng
(74) *Attorney, Agent, or Firm* — Sughrue Mion, PLLC

(57) ABSTRACT

A portable communication device (1) is capable of setting a sleep mode as an operation mode. An operation receiver (101) receives operations given by a user. A setter (102) sets the operation mode to the sleep mode when the operation receiver (101) receives no operation for a first time period. A displayer (103) displays an indicator on a display when the operation receiver (101) receives a first operation in the sleep mode. A launcher (104) launches, when the operation receiver (101) receives operations for specifying the indicator, an application program associated with the specified indicator.

13 Claims, 11 Drawing Sheets

Related U.S. Application Data continuation of application No. 14/382,460, filed as application No. PCT/JP2013/055564 on Feb. 28, 2013, now Pat. No. 10,331,286.

(51) Int. Cl.

| | | |
|---|---|---|
| *G06F 1/3228* | (2019.01) | |
| *G06F 1/3215* | (2019.01) | |
| *G06F 1/3234* | (2019.01) | |
| *G06F 1/16* | (2006.01) | |
| *H04W 52/02* | (2009.01) | |
| *H04M 1/72463* | (2021.01) | |
| *G06F 1/3231* | (2019.01) | |
| *G06F 3/04842* | (2022.01) | |
| *G06F 3/0488* | (2022.01) | |

(52) U.S. Cl.
CPC .......... *G06F 1/3218* (2013.01); *G06F 1/3228* (2013.01); *G06F 1/3231* (2013.01); *G06F 1/3265* (2013.01); *G06F 3/04842* (2013.01); *H04M 1/724634* (2022.02); *H04W 52/0254* (2013.01); *G06F 3/0488* (2013.01); *Y02D 10/00* (2018.01); *Y02D 30/70* (2020.08)

(58) Field of Classification Search
CPC . G06F 3/04842; G06F 1/3215; Y02D 70/142; Y02D 10/153
See application file for complete search history.

(56) References Cited

U.S. PATENT DOCUMENTS

| | | | |
|---|---|---|---|
| 2003/0208683 | A1 | 11/2003 | Johnson |
| 2006/0205432 | A1 | 9/2006 | Hawkins et al. |
| 2007/0150842 | A1 | 6/2007 | Chaudhri et al. |
| 2008/0122796 | A1 | 5/2008 | Jobs et al. |
| 2010/0188348 | A1 | 7/2010 | Aono |
| 2010/0269040 | A1 | 10/2010 | Lee |
| 2010/0306705 | A1 | 12/2010 | Nilsson |
| 2010/0316797 | A1 | 12/2010 | Ying et al. |
| 2011/0025648 | A1 | 2/2011 | Laurent et al. |
| 2011/0034208 | A1 | 2/2011 | Gu et al. |
| 2011/0106365 | A1 | 5/2011 | Miyake et al. |
| 2011/0256848 | A1 | 10/2011 | Bok et al. |
| 2012/0009896 | A1 | 1/2012 | Bandyopadhyay et al. |
| 2012/0040611 | A1 | 2/2012 | Griffin et al. |
| 2012/0084691 | A1 | 4/2012 | Yun |
| 2012/0311499 | A1* | 12/2012 | Dellinger ............. H04N 23/632 715/835 |
| 2013/0201164 | A1 | 8/2013 | Omori et al. |

FOREIGN PATENT DOCUMENTS

| | | |
|---|---|---|
| JP | H08-313905 A | 11/1996 |
| JP | 2000-35948 | 2/2000 |
| JP | 2001-117070 | 4/2001 |
| JP | 2001-171390 A | 6/2001 |
| JP | 2005-309751 A | 11/2005 |
| JP | 2007-11862 | 1/2007 |
| JP | 2007-329523 | 12/2007 |
| JP | 2008-271499 | 11/2008 |
| JP | 2009-003628 | 1/2009 |
| JP | 2009-521753 | 6/2009 |
| JP | 2009-253333 A | 10/2009 |
| JP | 2010-541046 | 12/2010 |
| JP | 2011-182072 | 9/2011 |
| JP | 2011-198055 | 10/2011 |
| JP | 2011-199637 | 10/2011 |
| JP | 2011-250135 | 12/2011 |
| JP | 2011-257950 A | 12/2011 |
| WO | 2012/026395 A1 | 3/2012 |

OTHER PUBLICATIONS

Gazer, "iPhone 4S Super Manual", 1st Edition, Shuwa System, Dec. 3, 2011, p. 215-216 Cited in JPOA.
Office Action dated Sep. 4, 2020, by Japanese Patent Office in counterpart Japanese Patent Application No. 2019-220793.
Notification of Reasons for Refusal, dated May 28, 2018, issued by the Japanese Patwent Office in counterpart Japanese Patent Application No. 2017-154332.
Office Action dated Oct. 11, 2016, by the Japanese Patent Office in counterpart Japanese Patent Application No. 2014-502393.
Notification of Reasons for Rejection dated Feb. 7, 2017, by the Japanese Patent Office in counterpart Japanese Patent Application No. 2014-502393.
Notification of Reasons for Rejection dated Feb. 7, 2017, by the Japanese Patent Office in counterpart Japanese Patent Application No. 2016-239629.
Notification of Reasons for Rejection issued by the Japanese Patent Office in counterpart Japanese Patent Application No. 2016-239629 dated Apr. 11, 2017.
European Office Action issued by the European Patent Office in counterpart European Patent Application No. 13 755 401.0 dated Feb. 5, 2018.
Extended European search report, dated Sep. 17, 2015; Application No. 13755401.0.
International Search Report, PCT/JP2013/055564, dated May 14, 2013.
Japanese Office Action for JP Application No. 2018-214366 dated Nov. 2, 2021 with English Translation.
MobileASCII vol. 9 Weekly ASCII, 2012 4/4, Japan, Feb. 29, 2012 issue, p. 20-21, 30-35, 38-43.
Xperia acroHD SO-03D operation manual, Japan, Feb. 29, 2012 issue, the 1.1 edition, p. 35-37, 64-69, 123-124.
Office Action dated Mar. 6, 2020, issued in co-pending U.S. Appl. No. 16/695,623.
Notification of Reasons for Refusal, dated Aug. 28, 2019, issued by the Japanese Patent Office in counterpart Japanese Patent Application No. 2018-214366.
Japanese Office Communication for JP Application No. 2020-185598 dated Dec. 20, 2022 with English Translation.
Communication dated Jun. 20, 2023 issued by the Japanese Patent Office for Japanese Patent Application No. 2020-185598.

* cited by examiner

FIG.10

| APPLICATION PROGRAM ID | INDICATOR ID | SIMPLE MENU |
|---|---|---|
| APPLICATION PROGRAM AP1 | 0034 | — |
| FUNCTION K OF APPLICATION PROGRAM AP1 | 0021 | ○ |
| APPLICATION PROGRAM AP2 | 0021 | — |
| ... | ... | ... |
| APPLICATION PROGRAM APn | 8843 | ○ |

INFORMATION PROCESSING DEVICE, PROCESSING METHOD, AND RECORDING MEDIUM

CROSS-REFERENCE TO RELATED PATENT APPLICATIONS

This application is a Continuation of U.S. patent application Ser. No. 16/414,305, filed May 16, 2019, which is a Continuation of U.S. patent application Ser. No. 14/382,460, filed Sep. 2, 2014, which is a National Stage Entry of International Application No. PCT/JP2013/055564, filed Feb. 28, 2013, which claims priority from Japanese Patent Application No. 2012-047248, filed Mar. 2, 2012. The entire contents of the above-references applications are expressly incorporated herein by reference.

TECHNICAL FIELD

The present disclosure relates to an information processing device, a processing method, and a non-transitory recording medium.

BACKGROUND ART

Some portable terminals have a function of becoming a sleep mode that consumes little power when no operation has been given for a certain time period. In order to use a portable terminal in a sleep mode, operations of canceling the sleep mode and displaying a menu for selecting a function, and of selecting a desired function (application program) through the menu to launch the application program are necessary. Hence, there is a demand to simplify the operation to utilize the function.

Patent Literature 1 discloses a portable terminal that has a lock mode. The user cannot use the portable terminal unless canceling the lock mode.

CITATION LIST

Patent Literature

Patent Literature 1: Japanese Unexamined Patent Publication No. 2010-541046

SUMMARY OF INVENTION

Technical Problem

If a portable terminal having both sleep node and lock mode is utilized, in order to utilize such a portable terminal, the following operations are required. (1) To cancel the sleep mode and display an unlocking screen. (2) To cancel the lock through the unlocking screen. (3) To display a menu for selecting an application. (4) To select a desired application through the menu to launch the application. However, the aforementioned successive operations are bothersome for a user. In addition, performing aforementioned successive operations every time an application program is launched leads to large power consumption.

The present disclosure has been made to address the aforementioned problems, and it is an objective of the present disclosure to provide an information processing device, a processing method, and a non-transitory recording medium that have a sleep mode and facilitate use of functions.

Solution to Problem

An information processing device according to the first aspect of the present disclosure is capable of setting, as an operation node, a sleep mode in which nothing is displayed on a display, and the information processing device includes: an operation receiver that receives operations given by a user, a setter that sets the operation mode or the information processing device to the sleep mode when the operation receiver receives no operation for a first time period; a displayer that displays, on the display, at least one indicator associated in advance with at least one application program selected in advance from a plurality of application programs executable by the information processing device when the operation mode of the information processing device is set in the sleep mode and the operation receiver receives a first operation: and a launcher that launches, when the operation receiver receives an operation of specifying the indicator, the application program associated with the specified indicator.

A processing method according to the second aspect of the present disclosure includes: a setting step for setting an operation mode to a sleep mode when no operation by a user is received for a first time period; a displaying step fir displaying, when a first operation is received in the sleep mode, at least one indicator associated in advance with at least one application program selected in advance from a plurality of application program; and a launching step for launching, when an operation of specifying the indicator is received, the application program associated with the specified indicator.

A computer-readable non-transitory recording medium according to the third aspect of the present disclosure has stored therein a program that causes a computer to function as: an operation receiver that receives operations given by a user; a setter that sets the operation mode of the computer to the sleep mode when the operation receiver receives no operation for a first time period: a displayer that displays at least one indicator associated in advance with at least one application program selected in advance from a plurality of application programs executable by the computer when the operation mode of the computer is set in the sleep mode and when the operation receiver receives a first operation; and a launcher that launches, when the operation receiver receives an operation of specifying the indicator, the application program associated with the specified indicator.

Advantageous Effects of Invention

According to the present disclosure, an information processing device, a processing method, and a non-transitory recording medium which facilitate use of functions in a sleep mode are provided.

BRIEF DESCRIPTION OF DRAWINGS

FIG. 10 is a diagram illustrating an example of managing table;

DESCRIPTION OF EMBODIMENTS

An information processing device and a processing method according to an embodiment of the present disclosure will be explained below using a portable communication device as an example.

(I. Hardware Configuration of Portable Communication Device)

Figure 1:
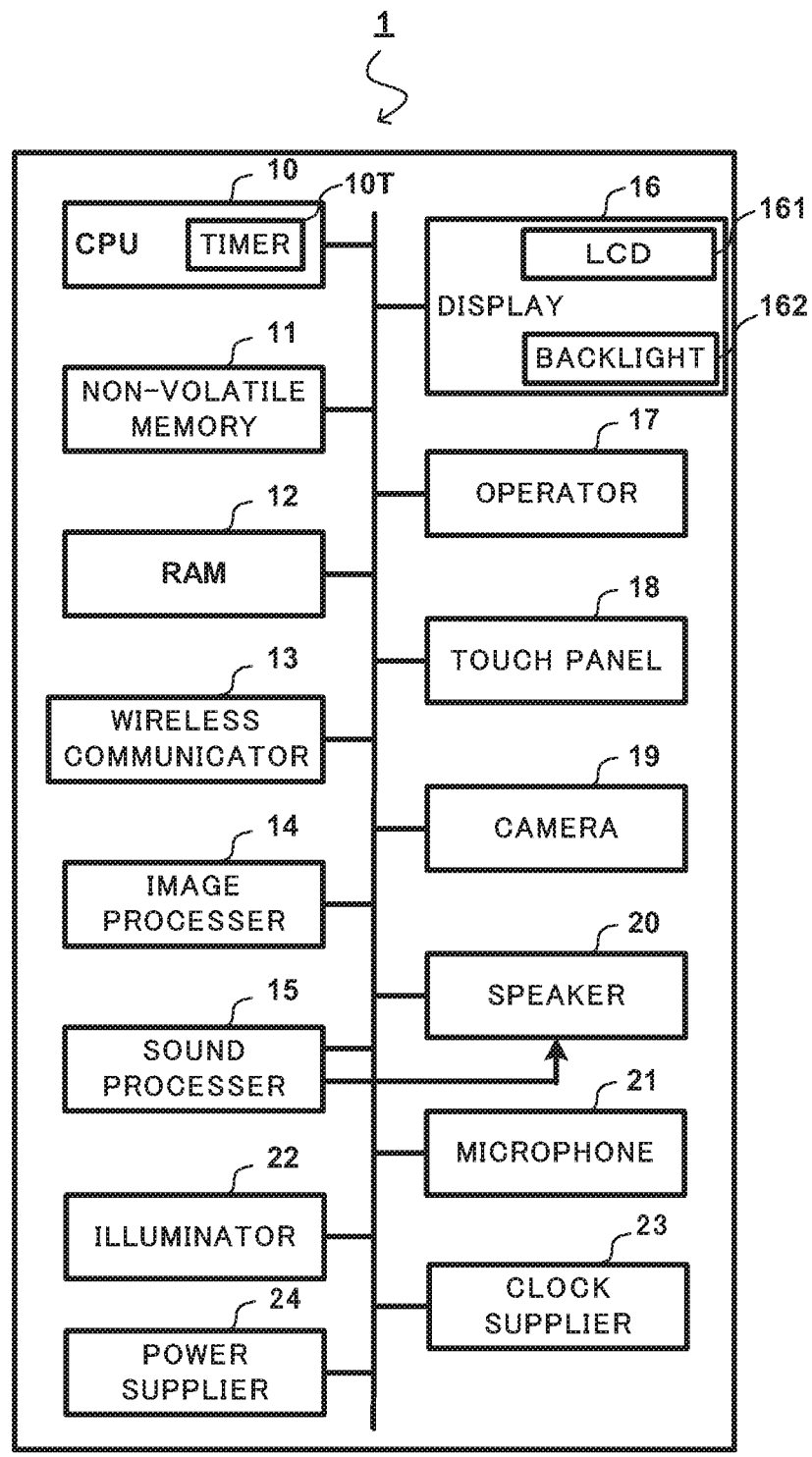
FIG. 1 is a diagram illustrating a hardware configuration of a portable communication device according to an embodiment of the present disclosure.

First, an explanation will be given of a hardware configuration of a portable communication device 1 according to this embodiment. As illustrated in FIG. 1, the portable communication device 1 includes a CPU (Central Processing Init) 10, a non-volatile memory 11, a RAM (Random Access Memory) 12, a wireless communicator 13, an image processor 14, a sound processor 15, a display 16, an operator 17, a touch panel 18, a camera 19, a speaker 20, a microphone 21, an illuminator 22, a clock supplier 23, and a power supplier 24.

The CPU 10 runs an application program stored in the non-volatile memory 11, and the RAM 12 to realize various functions including a telecommunication function. The CPU 10 sets the operation mode of the portable communication device 1 to a normal mode, a sleep mode, a transition mode, and the like. In addition, the CPU 10 includes a timer 10T that count % a time.

The non-volatile memory 11 includes a ROM (Read Only Memory) and a rewritable non-volatile memory. The ROM stores an operating system which is necessary to control the portable communication device 1 overall and various fixed data. In addition, the rewritable non-volatile memory includes a flush memory and the like, and stores application programs such as application programs downloaded by a user.

The RAM 12 temporary stores data and programs, and functions as a work area when the CPU 10 executes various processes.

The wireless communicator 13 is a unit that preforms wireless communication with base stations, and exchanges data through an unillustrated antenna (for example, a built-in antenna). The wireless communicator 13 may have wireless IAN communication function. In this case, the wireless communicator 13 performs wireless IAN communication with access points. In addition, the wireless communicator 13 is allocated with a unique MAC (Media Access Control) address.

The image processor 14 processes data read from the non-volatile memory 11, image data imaged by the camera 19, or data processed by the CPU 10, and stores the processed data in the RAM 12.

The sound processor 15 converts sound data read from the non-volatile memory 11 into analog sound signals, amplifies such analog sound signals, and make the speaker 20 or a headphone to be connected to the portable communication device 1 output sound. In addition, the sound processor 15 convers sound input through the microphone 21 into digital sound signals, and stores the digital sound signals in the RAM 12.

The display 16 includes an LCD (Liquid Crystal Display) 161, a backlight 162, a display controller, and the like and displays images in accordance with a control by the CPU 10. As exemplarily illustrated in FIG. 2, the display 16 is disposed on a primary surface of a casing, and displays various images.

The operator 17 illustrated in FIG. 17 includes, buttons disposed on the casing of the portable communication device 1 and the like, and receives inputting of instructions in accordance with operations given by the user. As is exemplarity illustrated in FIG. 2, the operator 17 includes multiple operation keys 17a, 17b. 17e, and a software keyboard 31 displayed on the display 16. In addition, the operator 17 includes an unillustrated power button.

The touch panel 18 in FIG. 1 is disposed so as to overlap the front face of the display 16, and receives an inputting through touches by the finger of the user or a touch pen.

The camera 19 images images of, for example, a space in accordance with instructions by the user, and converts the imaged image into electric signals. The camera 19 includes, for example, a CMOS (Complementary MOS) sensor.

The speaker 20 outputs sound in accordance with the sound signals amplified by the sound processor 15. As is exemplarily illustrated in FIG. 2, the speaker 20 is disposed at the upper portion of the casing.

The microphone 21 illustrated in FIG. 1 receives analog sound signals like the user's voice, and the received analog sound signals are processed by the sound processor 15. The microphone 21 is, as is exemplarily illustrated in FIG. 2, disposed at the lower portion of the casing.

Figure 2:
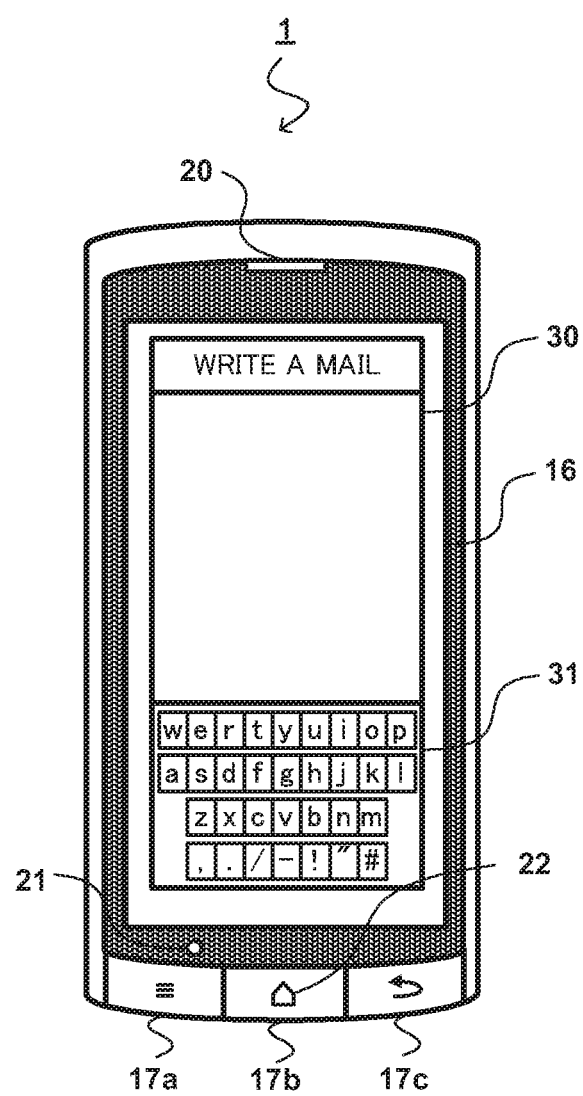
FIG. 2 is a diagram illustrating an external view of the portable communication device according to the embodiment.

The illuminator 22 illustrated in FIG. 1 includes, for example, one or multiple LEDs (light Emitting Diodes) that emit light of single or multiple colors. The illuminator 22 emits light with an arbitrary color while a telephone call or various operations are performed on the portable communication device 1. The disposed area of the LEDs and the number of the LEDs are arbitrary. In FIG. 2, the LED is disposed at the operation key 17b.

The clock supplier 23 includes an oscillating circuit, and supplies an operating clock signal to each configuration element. The clock supplier 23 changes the frequency of the supplying operating clock in accordance with a control by the CPU 10.

The power supplier 24 supplies operating power to the aforementioned CPU 10 to clock supplier 23. The power supplier 24 controls supply, turn off, and voltage and the like of power in accordance with a control by the CPU 10.

(2. Functional Configuration of Portable Communication Device 1)

Figure 3:
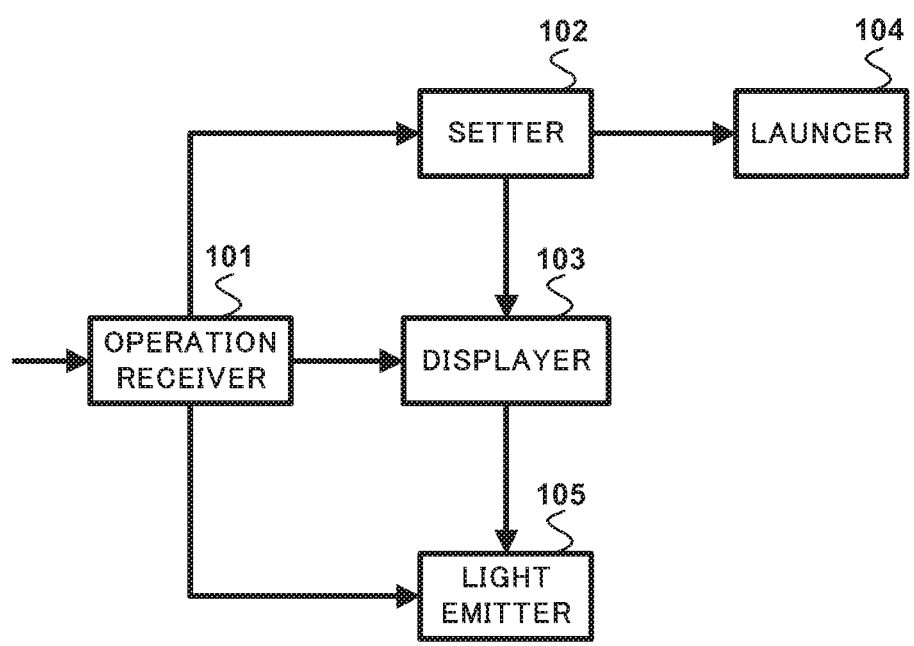
FIG. 3 is a diagram illustrating a functional configuration of the portable communication device according to the embodiment.

The portable communication device 1 employing the aforementioned physical configuration functionally includes, as illustrated in FIG. 3, an operation receiver 101, a setter 102, a displayer 103, a launcher 104, and a light emitter 105. The portable communication device 1 includes a telecommunication function, a camera function, and the like, but FIG. 3 mainly illustrates characteristic portions, and does not illustrate other portions.

The operation receiver 101 receives operations by the user. For example, in the state illustrated in FIG. 2, when the user touches the software keyboard 31, the operation receiver 101 receives such a touch operation. In addition, the operation receiver 101 accepts pressing operations of the power button and the operation keys 17a to 17c. The operation receiver 101 is realized by the CPU 10, the operator 17, the touch panel 18, and the like.

The setter 102 sets the operation mode of the portable communication device 1. The portable communication device 1 has at least a normal mode, a sleep mode, and a transition mode as operation modes.

In this case, the sleep mode is a state in which power consumption is low in comparison with power consumption during telecommunication or an operation mode that enables executions of application programs and the like (normal mode), and an arbitrary designation such as a power saving mode, a backup mode, a standby mode, and the like can be allocated to the sleep mode. In the sleep mode, the power supplier 24 turns off a power supply to the non-volatile memory 11, the image processor 14, the sound processor 15, the display 16 (LCD 161, backlight 162, display controller), and the camera 19. In addition, the power supplier 24 lowers the voltage of the power supplied to the CPU 10 in comparison with the voltage in the normal mode. The clock supplier 23 sets the frequency of the operating clock supplied to the CPU 10 in the sleep mode to be lower than the frequency of the operating clock supplied to the CPU 10 in the normal mode. Hence, in general, the sleep mode is a state in which no power is supplied to the display 16, and no image is displayed, and thus execution of the application program is disabled.

Moreover, the transition mode is a sleep mode whose power saving level is low. In the transition mode, the power supplier 24 maintains a state in which power supply to the non-volatile memory 11, the image processor 14, the sound processor 15, the display 16 (LCD 161, backlight 162, and display controller), and the camera 19 is turned off. On the other hand, the power supplier 24 supplies normal operating power to the LCD 161 and the display controller both forming the display 16, but supplies smaller power than a normal case to the backlight 162. In addition, the power supplier 24 supplies the same voltage to the CPU 10 as the normal mode. Still further, in the transition mode, the clock supplier 23 sets the frequency of the operating clock to be same with the frequency in the normal mode.

The setter 102 is capable of setting a lock. When the setter 102 sets the kick, the operation receiver 101 does not receive operations other than a first operation and a second operation to be discussed later.

The setter 102 is realized by cooperative operations of the CPU 10, the clock supplier 23, and the power supplier 24.

The displayer 103 displays various images.

In the normal mode, as is exemplarily illustrated in FIG. 2, the displayer 103 displays windows in accordance with operations and processes. In addition, the displayer 103 displays, in the normal mode, a normal menu including multiple indicators 45 as illustrated in FIG. 11B (d).

In this case, the indicator is an indicator (for example, icon, and button) that is in advance associated with application programs (functions) executable by the portable communication device 1.

Figure 4:
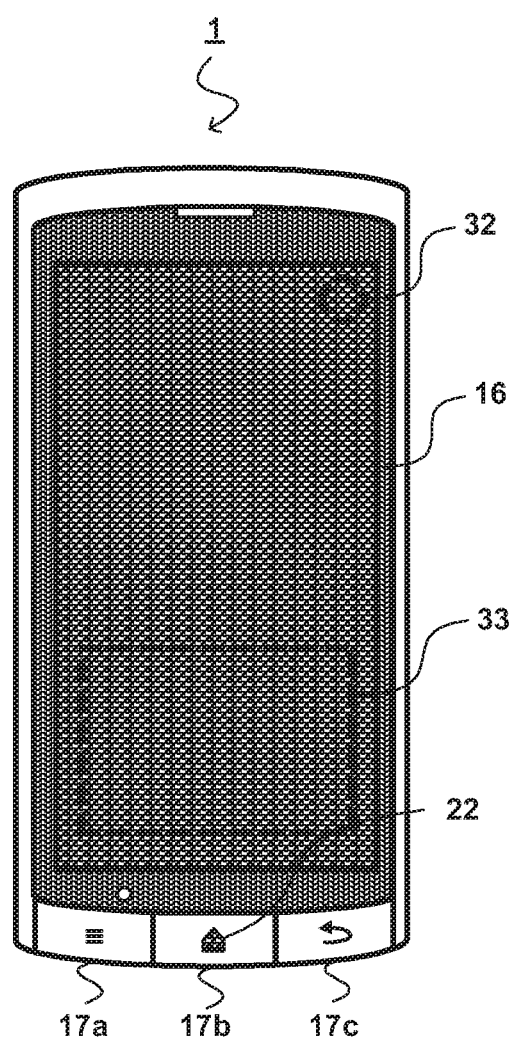
FIG. 4 is a diagram for explaining a state of a display when the portable communication device according to the embodiment is in a sleep mode.

On the other hand, in the sleep mode, since power supply to the LCD 161 and the backlight 162 is tuned off, as illustrated in FIG. 4, no image is displayed.

Still further, in the transition mode, the displayer 103 displays a simple menu that includes at least one indicator associated in advance with at least one (in this example, three) application program (function) selected beforehand from the application programs executable by the portable communication device 1. However, for the backlight 162 is darker than the normal mode, the displayed images are darker than the normal mode.

Note that the indicator may be an indicator (icon, button) associated in advance with some functions selected from the multiple functions realized by the application program executable by the portable communication device 1.

In this case, at least one function selected beforehand is a relatively frequently utilized function such as a playing function of a music player/recorder software, a new received mail displaying function or a time displaying function of a mail software.

The application program or the function of the application program associated with the indicator in the simple menu displayed by the displayer 103 in the transition mode may be set by the user as needed. At this time, the application program or some functions of the application program that can be associated with the indicator in the simple menu may be limited to application programs or the functions of the application program requiring small number of operations or the application programs or the functions of the application program which consume small amount of power. Specifically, the operation receiver 101 receives operations for specifying the application programs or the functions of the application programs to be associated with the indicators in the simple menu.

The managing table illustrated in FIG. 10 manages application programs associated with the indicators in the normal menu and the simple menu. The N number of application programs executable by the portable communication device 1 are allocated with respective application IDs to identify the respective application programs. In addition, the managing table registers the ID of the indicators indicating each application program or some functions realized by that application program. The application program or the function selectable through the simple menu displayed in the transition mode has a "circle" mark in the field of the simple menu in the managing table. The application program or the function not selectable through the simple menu has a "hyphen" mark in the filed of the simple menu.

Figure 5:
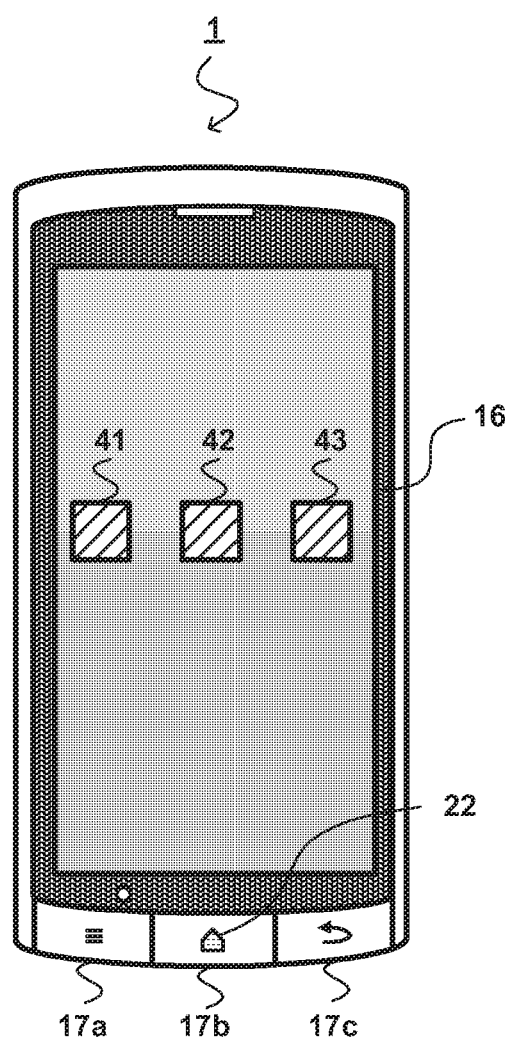
FIG. 5 is a diagram illustrating an example of simple menu displayed by the portable communication device according to the embodiment.

When displaying the indicator in the simple menu in the window, the displayer 103 displays a background of the indicator darker than the window in the normal mode. For example, as illustrated in FIG. 5, the displayer 103 displays the background areas of indicators 41, 42, 43 in the display 16 in a manner darker than the window in FIG. 2.

In addition, the displayer 103 displays the indicator in the simple menu so that the brightness (lightness, luminance, or lighting intensity) is darker than the brightness with which the indicator (menu) is displayed in the normal anode.

Figure 6:
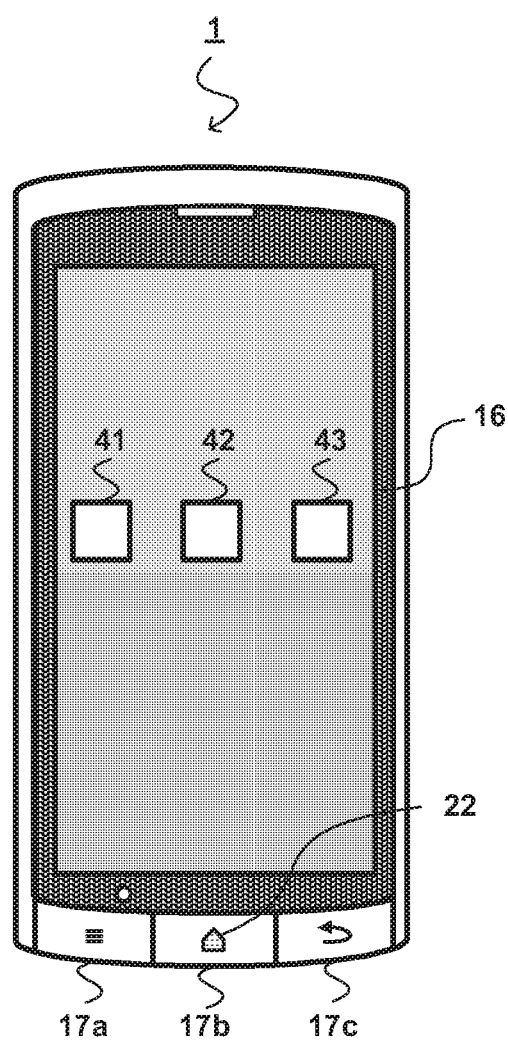
FIG. 6 is a diagram illustrating another example of simple menu displayed by the portable communication device according to the embodiment.

Still further, the displayer 103 may increase the brightness with which the background of the indicator in the simple menu is displayed with time. For example the indicators 41, 42, and 43 in FIG. 5 are displayed in a manner darker than an indicator 45 in the normal menu displayed in the window in the normal mode and illustrated in FIG. 11B (d). The displayer 103 may increase the brightness with which the indicators 41, 42, 43 are displayed as the time passes, and eventually, displays the indicators 41, 42, and 43 with the same brightness as that of the indicator 45 in the normal menu displayed in the normal mode as illustrated in FIG. 6.

The displayer 103 is realized by the cooperative works of the CPU 10, the image processor 14, the display 16, and the power supplier 24.

An explanation will now be given of a relationship among an operation received by the operation receiver 101, an operation mode set by the setter 102, and the windows displayed by the displayer 103.

Figure 9:
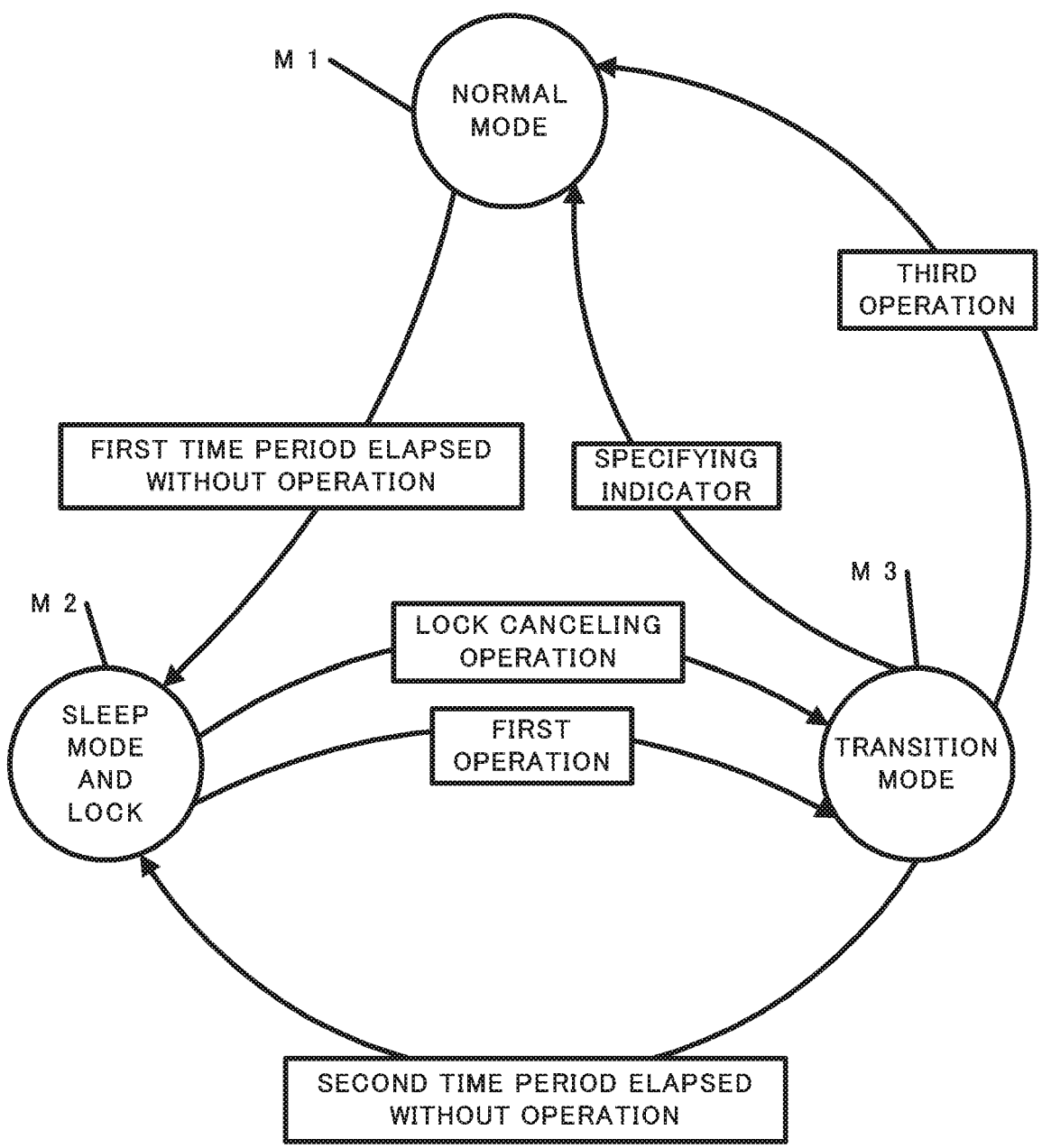
FIG. 9 is a diagram illustrating an example of mode transition of the portable communication device according to the embodiment.

The portable communication device 1 has, as the operation states, at least a state M1 having the operation mode set to the normal mode, a state M2 having the operation mode set to the sleep mode and being locked, an a state M3 having the operation mode set to the transition mode illustrated in FIG. 9.

When the operation receiver 101 receives no operation for a first time period, the setter 102 sets the operation mode from the normal mode to the sleep mode. The first time period is, for example, three minutes. The first time period is changeable by the operation given by the user.

When setting the operation mode of the portable communication device 1 to the sleep mode, the setter 102 sets up the lock. Once the lock is set, the operation receiver 101 does not receiving the operation other than the first operation and the second operation.

In this case, the first operation is operations drawing a predetermined trajectory on the window like a slide operation or a gesture operation performed on the display 16 by the finger of the user or the like. The term "gesture operation" indicates various operations performed by fingers or a touch pen including a travel distance of the linger, a travel speed, a travel trajectory, a double-tapping or the like, and each gesture operation is associated with the operation in advance.

Alternatively, the first operation may be operations performed on a predetermined location in the window for a predetermined time like an operation of pressing a certain position 32 of the display 16, which is shown in FIG. 4, for a predetermined time (for example, three seconds).

Further alternatively, the First operation may be operations performed on a predetermined area of the window such as an operation of touching a certain area 33 of the display 16 which is shown in FIG. 4.

The first operation can be limited to one of those, or all of the aforementioned operations may be set as the first operation.

When the operation receiver receives the first operation (for example, slide operation) in the sleep mode with the lock being set, the setter 102 sets the operation mode to the transition mode.

When the setter 102 sets the operation mode to the transition mode, as illustrated in FIG. 5, the displayer 103 displays the simple menu including the indicators 41, 42, 43 indicating predetermined application programs (or certain functions) on the display 16.

When the operation receiver 101 does not receive an operation for specifying the indicator and a second time period has passed after the simple menu including at least one indicator is displayed, the displayer 103 stops displaying the indicator (simple menu).

For example, after the simple menu including the indicators 41, 42, and 43 is displayed as illustrated in FIG. 5 and the second time period that is one minute has elapsed with the operation receiver 101 receiving no operation to specify the indicator, the displayer 103 stops displaying the indicators 41, 42, and 43, and the display 16 becomes a state in which nothing is displayed on the display illustrated in FIG. 4.

On the other hand, the second operation is, for example, an operation of pressing the operation key 17a for a predetermined time period.

When the operation receiver 101 receives the second operation in the sleep mode with the lock being set, the displayer 103 displays an unlocking window for canceling the lock.

Figure 7:
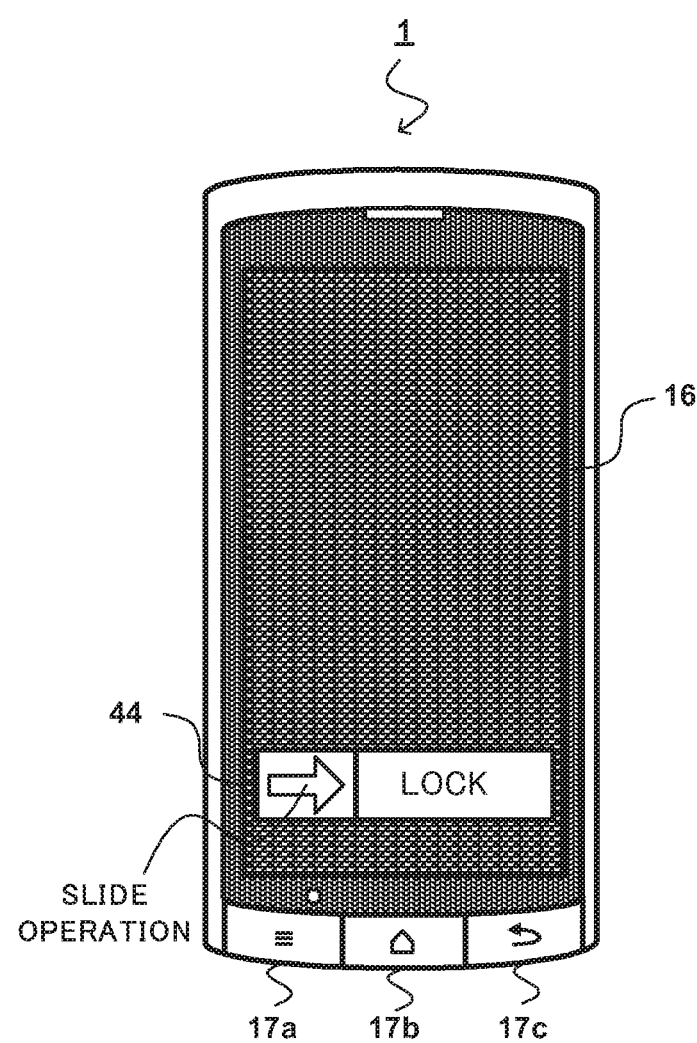
FIG. 7 is a diagram illustrating an example of unlocking screen displayed by the portable communication device according to the embodiment.

When, for example, the user presses the operation key 17a for a certain time period (for example, three seconds) as illustrated in FIG. 11B (a) in the sleep mode with the lock being set, as illustrated in FIGS. 7 and 11B (b), the displayer 103 displays the unlocking window including a lock image 44.

When the operation receiver 101 receives the first operation after the displayer 103 displays the unlocking window, the setter 102 cancels the lock, and sets the operation mode of the portable communication device 1 to the transition mode. When the setter 102 cancels the lock and sets the operation mode of the portable communication device 1 to the transition mode, the displayer 103 displays the simple menu including at least one indicator associated in advance with the application program.

When, for example, in FIG. 7, the user executes finger sliding operation that is the first operation over the lock image 44, the setter 102 cancels the lock, and sets the operation mode of the portable communication device 1 to the transition mode. When the setter 102 cancels the lock and sets the operation mode of the portable communication device 1 to the transition mode, as illustrated in FIG. 5, the displayer 103 displays the simple menu including the indicators 41, 42, and 43.

The first operation given to cancel the lock after the unlocking window is displayed may be the same as the first operation to display the indicator, and is not limited to the above-explained examples. For example, such a first operation may be a gesture operation to the area 33 other than the lock image 44 on the display 16.

When the operation receiver 101 receives a third operation in the transition mode, the setter 102 sets the operation mode to the normal mode. Next, the displayer 103 displays a menu including the indicator associated with the application program. The third operation is, for example, pressing against operation key 17c. When, for example, pressing against the operation key 17c which is the third operation is received with the simple menu illustrated in FIG. 11B (c) being displayed, the operation mode is set to the normal mode, and thus the normal menu including the indicator 45 as illustrated in FIG. 11B (d) is displayed.

When the operation receiver 101 receives an operation to specify the indicator, the launcher 104 launches the application program associated in advance with the specified indicator.

Figure 11A:
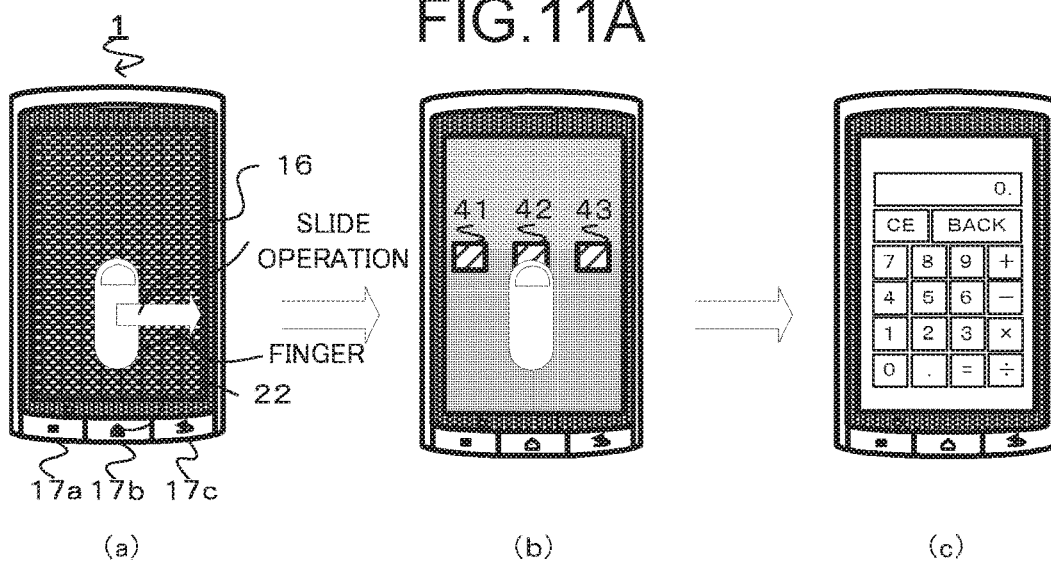
FIG. 11A (a) to (c) are diagrams illustrating example of operations of the portable communication device according to the embodiment.
Figure 11B:
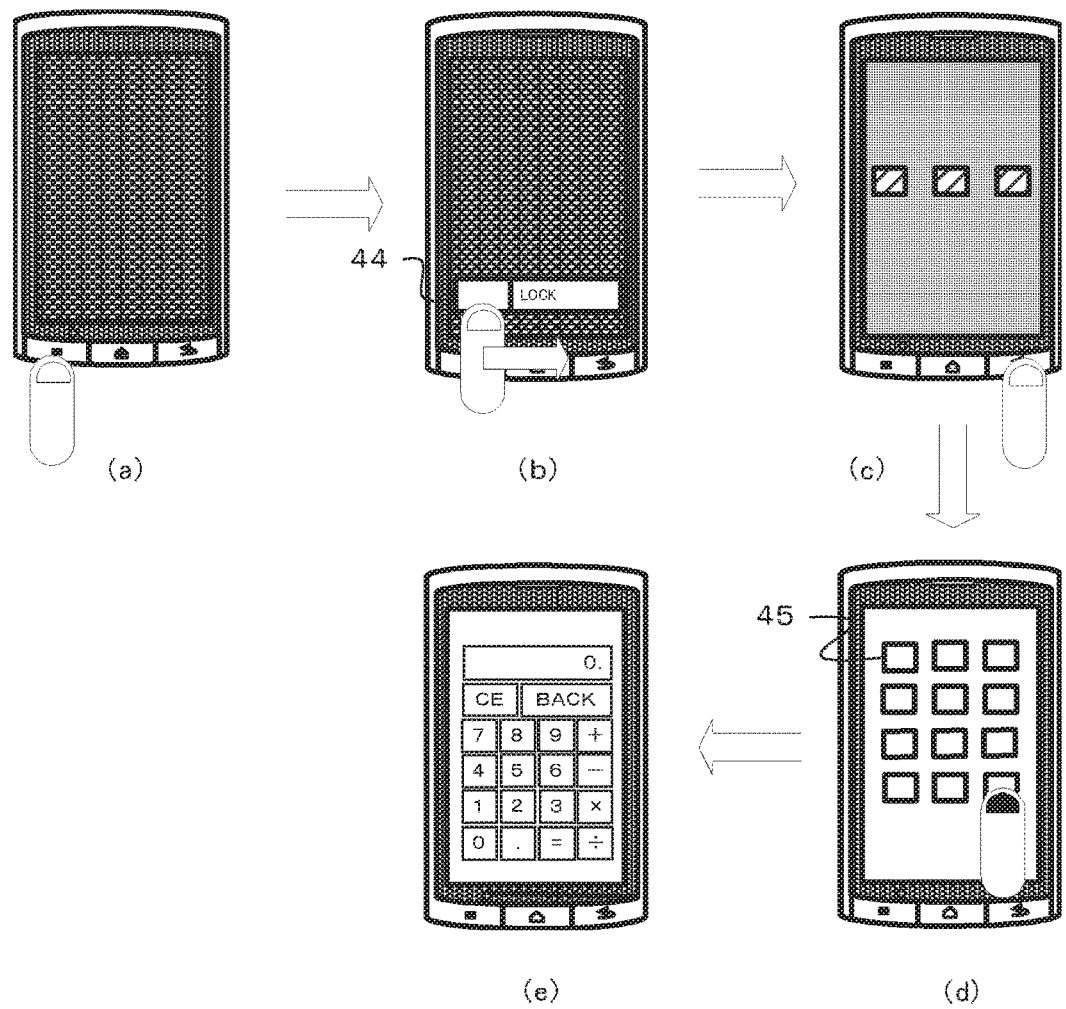
FIG. 11B (a) to (e) are diagram illustrating example of operations of the portable communication device.

When, for example, as illustrated in FIG. 11A (b), the finger of the user touches the indicator 42 as an operation to specify the indicator 42, the launcher 104 launches the application program (for example, a calculator software) associated in advance with the indicator 42.

The launcher 104 illustrated in FIG. 2 is realized by the CPU 10.

When the operation receiver 101 receives an operation in the normal mode, the light emitter 105 emits light. When the operation receiver 101 receives an operation in the transition mode, the light emitter 105 emits light which is darker than light emitted when the operation is received in the normal mode.

When, for example, the operation receiver 101 receives an operation in the normal mode, as illustrated in FIG. 2, the illuminator 22 emits light. When the operation mode transits from the normal mode to the sleep mode, as illustrated in FIG. 4, the illuminator 22 turns off. When the operation receiver 101 receives an operation in the transition mode, the illuminator 22 emits light which is darker than that in the state in FIG. 2 as illustrated in FIG. 5.

The light emitter 105 is realized by a cooperative work of the CPU to and the illuminator 22. The illuminator 22 controls light emission in accordance with the control by the CPU 10.

(3. Operation of Portable Communication Device 1)

An operation of the portable communication device 1 will be explained below with reference to FIG. 8. In the following explanation, the characteristic operation of the portable communication device 1 will be explained mainly. While detailed explanation will be omitted, the portable communication device 1 can execute various functions, such as a telecommunication, an imaging, and a music playing, like normal portable terminals.

Figure 8:
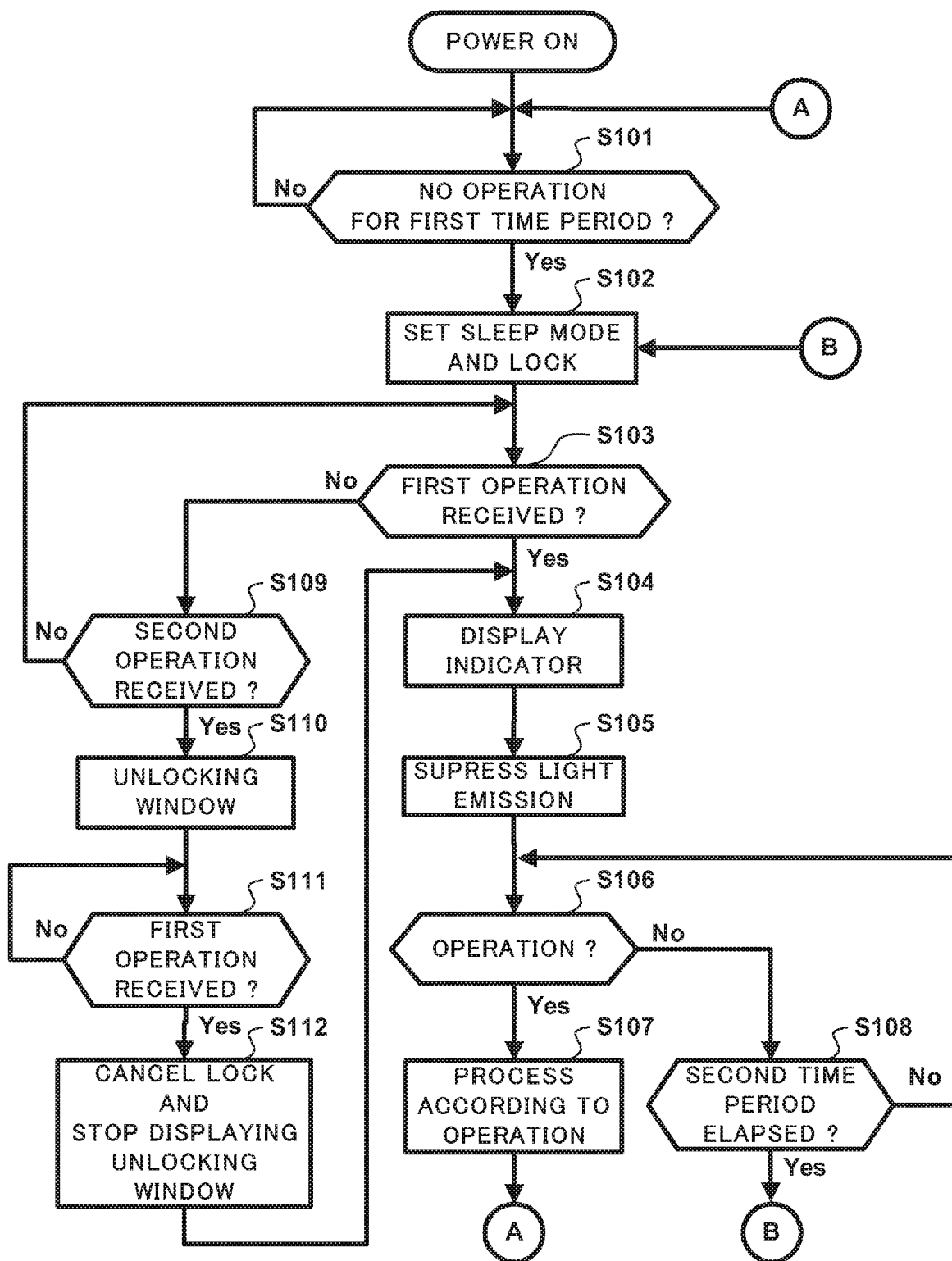
FIG. 8 is a flowchart for explaining the process executed by the portable communication device according to the embodiment.

When the power is turned on, the portable communication device 1 has the operation mode set to the normal mode, and starts the processes illustrated in the flowchart of FIG. 8.

The setter 102 determines (step S101) whether or not the operation receiver 101 received no operation for the first time period (for example, three minutes) through the timer 10T. When it is determined that the operation receiver 101 received no operation for the first time period (step S101: YES), the setter 102 sets the operation mode of the portable communication device 1 to the sleep mode, and, for example, controls the power supplier 24 to turn off power supply to the display 16. Simultaneously, the setter 102 sets (S102) the lock. When the kick is set, as explained above, the operations received by the operation receiver 101 other than the first operation and the second operation are invalidated.

When it is determined that the operation receiver 101 received an operation before the first time period elapses, or when it is determined that the operation receiver 101 received no operation but the first time period has not yet elapsed since the operation receiver 101 received the last operation (step S101: NO), the setter 102 repeats the step S101.

With the operation mode being set to the sleep mode and being locked, the displayer 103 determines (step S103) whether or not the operation receiver 101 received a slide operation that is the first operation. When it is determined that the operation receiver 101 received the first operation (step S103: YES), the displayer 103 refers to the managing table illustrated in FIG. 10, specifies the indicators 41, 42, and 43 as to be included in the simple menu, and displays (step S104) them as illustrated in FIG. 5.

Next, the light emitter 105 emits (step S105) light which is darker than light emitted when the operation receiver 101 receives an operation in the normal mode. For example, the light emitter 105 causes the one or multiple LEDs forming the illuminator 22 to emit light darker than the rated quantity (step S105). In FIG. 5, the illuminator 22 is dotted so as to indicate that the illuminator 22 emits light which is darker than the light emitted by the illuminator 22 when the operation is received in the normal mode exemplarily illustrated in FIG. 2.

Subsequently, the operation receiver 101 determines (step S106) whether or not any operation has been given. When the operation receiver 101 have received an operation which is an operation to specify any one of the indicators 41 to 43 (step S106: YES), the setter 102 sets the operation mode to the normal mode, and the launcher 104 launches the application program or the function associated with the specified indicator in advance (step S107). After the application program is launched, the process returns to the step S101, and a next operation input is waited.

When it is determined that the operation received by the operation receiver 101 is the third operation (operation to the operation key 17c) (step S106: YES), the setter 102 sets the operation mode to the normal mode, and the launcher 104 refers to the managing table illustrated in FIG. 10 and displays the normal menu including a large number of indicators. Thereafter, the process returns to the step S101, and a next operation input is waited. Subsequently, the process in accordance with an operation through the normal menu is executed.

On the other hand, when the launcher 104 determines in the step S106 (step S106: NO) that the operation receiver 101 has not received an operation to specify the indicator, the setter 102 determines (step S108) whether or not the second time period has elapsed.

When the setter 102 determines (step S108: YES) that the second time period has elapsed since the indicator is displayed in the step S104, the process returns to the step S102, and the setter 102 sets the sleep mode again, and also sets up the lock. Hence, the display 16 transits, for example, from the displaying state in 11G. 5 to a non-displaying state in FIG. 4, and operations received by the operation receiver 101 other than the first operation and the second operation are invalidated. When the setter 102 determines (step S108: NO) that the second time period has not yet elapsed since the indicator is displayed, the process returns to the step S106.

On the other hand, in the step S103, when it is determined that the operation receiver 101 received no first operation while the operation mode is set to the sleep mode with the lock set (step S103: NO), the displayer 103 determines (step S109) whether or not the operation receiver 101 received the second operation.

When it is determined that the operation receiver 101 received the second operation (step S109: YES), the displayer 103 displays (step S110) the unlocking window. When, for example, it is determined that the operation receiver 101 received pressing against the operation key 17a that is the second operation (step S109: YES), the displayer 103 displays the unlocking window including the lock image 44 as illustrated in FIG. 7. When it is determined that the operation receiver 101 has not received the second operation (step S109: NO), the displayer 103 returns the process to the step S103.

The setter 102 determines (step S111) whether or not the operation receiver 101 received the first operation after the unlocking window is displayed. When the setter 102 determined (step S111: YES) that the operation receiver 101 received the first operation, the setter 102 cancels the lock, and the displayer 103 stops (step S112) displaying the unlocking window. Canceling of the lock may require inputting of passwords and the like.

Next, the process proceeds to step S104, and the indicators 41, 42, and 43 are displayed (step S104).

When the first operation has not been received for a predetermined time since the unlocking window was displayed, the displaying of the unlocking window may be canceled, and the process may be returned to the step S103.

Next, the above-explained operation will be explained with reference to a specific example.

For example, as illustrated in FIG. 11A (a), it is presumed that the portable communication device 1 is in the sleep mode. When a sliding operation was executed on the display 16 of the portable communication device 1, such an operation is detected in the step S103 (step S103: YES). In this case, as illustrated in FIG. 11A (b), the simple menu (indicators 41 to 43) are displayed (step S104). The indicators 41 to 43 are displayed so that they gradually become brighter. In addition, the illuminator 22 emits darker light (step S105).

In this case, as illustrated in FIG. 11A (b), when the user specifies (selects) the indicator 42, such an operation is detected in the step S106, and as illustrated in FIG. 11A (c), the corresponding application program or some functions thereof are launched (step S107).

Moreover, as illustrated in FIG. 11B (a), it is presumed that the operation key 17a of the portable communication device 1 in the sleep mode is operated. This operation (the second operation) is detected in the step S109 (step S109: YES). Next, as illustrated in FIG. 11B (b), the unlocking window is displayed (step S110). In this case, when a slide operation (the first operation) is given, the determination in the step S111 is made as YES, and as illustrated in FIG. 11B (c), the simple menu (indicators 41 to 43) is displayed in the step S104 (step S104). The indicators 41 to 43 are displayed so that they gradually become brighter. In addition, the illuminator 22 emits darker light (step S105).

In this case, as illustrated in FIG. 11B (c), it is presumed that the user presses the operation key 17c. This operation is detected in the step S106, the operation mode is set to the normal mode, and the normal menu is displayed as illustrated in FIG. 11B (d) (step S107). When any indicator on the normal menu is specified, as illustrated in FIG. 11B (e), the corresponding application program or some functions thereof are launched (step S107).

As explained above, according to this embodiment, when the certain first operation is given while the operation mode of the portable communication device 1 is set to the sleep mode, the indicator (menu) to launch the specific application programs or specific functions is displayed. Hence, the application programs can be executed through a simple operation using the portable communication device 1 in the sleep mode.

Moreover, when no operation to specify the indicator is given for the second time period after the indicator is displayed, the indicator is erased from the window, thereby suppressing power consumption. The second time period may be set to be shorter than the first time period by which the operation mode is set to the sleep mode. By setting the second time period to be shorter than the first time period, the displaying of the indicator is stopped within a short time period, thus making the user to recognize that such a window is the one for simple operations.

The light emitted by the illuminator 22 when the operation receiver 101 receives an operation in the sleep mode is suppressed compared to the light emitted when the operation receiver 101 receives operations in the normal mode, thereby suppressing power consumption. Since light emitted is darker than that in the normal mode, the user can be made to recognize that such a window is the one for simple operations.

According to this embodiment, the lock to prevent wrong operations in the sleep node can be set. The operation to cancel the lock and the operation to make the indicator displayed am the same operation, and thus the indicator can be displayed through instinctive operations.

The indicator displayed in the simple menu (that is, application programs or some functions thereof) is selectable by the user as needed. The indicator displayed in the simple menu may be limited to the indicator of application programs with small number of operations or application programs with little power consumption.

By associating the predetermined function of an application program with the indicator, in comparison with a normal operation where "an application program is selected, and the desired function is selected, and this function is utilized", the number of operations to use the function is small, and thus power consumption is suppressed.

The indicator is displayed when operations of drawing a predetermined trajectory, operations performed at predetermined locations for predetermined time periods, or operations performed on predetermined areas are received, and thus the indicator is displayed when the user gives operations with purpose. Therefore, the displaying of the indicator due to wrong operations can be prevented.

The background of the indicator is displayed in a darker manner than the window in the normal mode, and thus it becomes possible for the portable communication device to let the user to visually recognize that such a window is not a normal window but a window to easily run application programs. Moreover, the indicator can be clearly distinguished from the background.

The brightness with which the indicator is displayed is set to be darker than the brightness with which menu displaying indicators are displayed in the normal node, thereby suppressing power consumption. In addition, it becomes possible for the portable communication device to let the user to recognize that such a window is a window for simple operations. In addition, by gradually increasing the brightness with which the indicator is displayed, the user only has to wait if it is difficult for the user to see the indicator, as the indicator becomes easier to see for the user.

In the above embodiment, the portable communication device 1 (for example, a smart phone) was shown as an example, but the present disclosure is applicable to all information processing devices which can be set in the sleep mode.

In the above-explained embodiment, the sleep mode was a mode in which the display 16 becomes a non-displaying state, but the present disclosure is not limited to this case. For example, in the sleep mode, the frequency of the operating clock supplied to the CPU 10 may be lowered in comparison with the normal mode, and the voltage applied to the RAM 12 may be lowered. In addition, power supply to the touch panel may be cut off in the sleep mode. In this case, as the first operation, operations given to the operator 17 are required.

The portable communication device 1 can be realized not only by an specialized system but also by a normal computer system. For example, a computer program for realizing the operations of the portable communication device 1 may be stored in a computer-readable non-transitory recording medium (for example, flexible disk, CD-ROM, DVD-ROM) and distributed therewith, and such a computer program may be installed in a computer to realize the portable communication device 1 that carries out the above-explained operations.

The above-explained computer program may be stored in a storage device (for example, a disk device) of a server device on a communication network like the Internet, and may be downloaded by a normal computer system to realize the above-explained portable communication device 1.

When the functions of the portable communication device 1 are realized by a cooperative work of an operating system and an application program, only the application program portion may be stored in a non-transitory recording medium or a storage device.

The above-explained computer program can be superimposed on carrier waves, and distributed through a communication network.

The present disclosure permits various embodiments and modifications without departing from the broadest scope and spirit of the present disclosure. The above-explained embodiment is to explain the present disclosure, and is not intended to limit the scope of the present disclosure. That is, the scope of the present disclosure should be indicated by the appended claims rather than the embodiment. Various modifications carried out within the appended claims and the equivalent range thereto should be within the scope of the present disclosure.

A part of or all of the above-explained embodiment can be described as following supplementary notes, but the present disclosure is not limited to the following supplementary notes.

(Supplementary Note 1)

An information processing device capable of setting, as an operation mode, a sleep mode in which nothing is displayed on a display, the information processing device including:
- an operation receiver that receives operations given by a user:
- a setter that sets the operation mode of the information processing device to the sleep mode when the operation receiver receives no operation for a first time period;
- a displayer that displays, on the display, at least one indicator associated in advance with at least one application program selected in advance from a plurality of application programs executable by the information processing device when the operation mode of the information processing device is set in the sleep mode and the operation receiver receives a first operation; and
- a launcher that launches, when the operation receiver receives operations for specifying the indicator, the application program associated with the specified indicator.

(Supplementary Note 2)

In information processing device according to supplementary note 1, in which when the operation receiver receives no operation for a second time period since the indicator was displayed, the displayer erases the indicator from the display.

(Supplementary Note 3)

The information processing device according to supplementary note 1 or 2, further including a light emitter that emits light when the operation receiver receives operations,
in which when the operation mode of the information processing device is set to the sleep mode and the operation receiver receives operations, the light emitter emits light which is darker than light emitted when the operation receiver receives operations before the operation mode of the information processing device is set to the sleep mode.

(Supplementary Note 4)

The information processing device according to any one of supplementary notes 1 to 3, in which:
the setter further sets up a lock when the operation mode of the information processing device is set to the sleep mode:
the operation receiver does not accept operations other than operations for canceling the lock and a second operation when the lock is set;
the displayer displays an unlocking window for operations for canceling the lock when the operation receiver receives the second operation while the operation mode of the information processing device is set to the sleep mode and the lock is set: and the setter cancels the lock and the displayer displays the indicator on the display when the operations for canceling the lock is performed through the unlocking window.

(Supplementary Note 5)

The information processing device according to supplementary note 4, in which the operation receiver accepts the first operation as the operations for canceling the lock.

(Supplementary Note 6)

The information processing device according to any one of supplementary notes 1 to 5, in which the operation receiver accepts operations for associating application programs with the indicator.

(Supplementary Note 7)

The information processing device according to any one of supplementary notes 1 to 6, in which the operation receiver accepts operations for associating functions selected from multiple functions realized by application programs with the indicator.

(Supplementary Note 8)

The information processing device according to any one of supplementary notes 1 to 7, in which the operation receiver accepts operations of drawing trajectories on the display as the first operation.

(Supplementary Note 9)

The information processing device according to any one of supplementary notes 1 to 8, in which the displayer displays a background of the indicator darker than a window displayed before the operation mode of the information processing device is set to the sleep mode.

(Supplementary Note 10)

The information processing device according to any one of supplementary notes 1 to 8, in which:
the displayer displays indicators indicating respective application programs executable by the information processing device before the operation mode of the information processing device is set to the sleep mode; and
the displayer displays, in the sleep mode, the indicators in a manner darker than the indicator displayed before the operation mode of the information processing device is set.

(Supplementary Note 11)

The information processing device according to supplementary note 10, in which the displayer increases a brightness with which the indicator are displayed as time passes.

(Supplementary Note 12)

A processing method including:
- a setting step for setting an operation mode to a sleep mode when no operation by a user is received for a first time period;
- a displaying step for displaying, when a first operation is received in the sleep mode, at least one indicator associated in advance with at least one application program selected in advance from a plurality of application program; and
- a launching step for launching, when an operation of specifying the indicator is received, the application program associated with the specified indicator.

(Supplementary Note 13)

A computer-readable non-transitory recording medium having stored therein a program that causes a computer to function as:

an operation receiver that receives operations given by a user;

a setter that sets the operation mode of the computer to the sleep mode when the operation receiver receives no operation for a first time period;

a displayer that displays at least one indicator associated in advance with at least one application program selected in advance from a plurality of application programs executable by the computer when the operation mode of the computer is set in the sleep mode and the operation receiver receives a first operation; and a launcher that launches, when the operation receiver receives an operation for specifying the indicator, the application program associated with the specified indicator.

The present application is based on Japanese Patent Application No. 201247248 filed on Mar. 2, 2012. The whole specification, claims, and drawings of Japanese Patent Application No. 2012-47248 are herein incorporated in this specification by reference.

The invention claimed is:

1. An information processing device, comprising:

a display configured to display a plurality of indicators each associated with at least one of a plurality of application programs;

a touch panel configured to detect a tap on the display; and at least one processor configured to cause the information processing device to perform a plurality of first operations and a plurality of second operations, wherein the first plurality of operations comprises:

gradually displaying, when the information processing device is in a locked state, a first indicator associated with a first application program, in response to receiving a first user operation; and executing the first application program in response to detecting a tap at the first indicator;

wherein the second plurality of operations comprises:

displaying, when the information processing device is in the locked state, an interface for receiving information for unlocking in response to a second user operation, displaying a second indicator associated with a second application program in response to receiving the information for unlocking;

executing the second application program in response to detecting a tap at the second indicator, wherein the first application program and the second application program are the same program, wherein a background image when the first indicator is displayed is different from a background image when the second indicator is displayed, wherein the background image when the first indicator is displayed is different from a background image when the interface for receiving the information for unlocking is displayed, and wherein the first indicator is user-configurable.

2. The information processing device according to claim 1, wherein the interface comprises a window configured to receive the information for unlocking.

3. The information processing device according to claim 1, wherein the information for unlocking comprises a password.

4. The information processing device according to claim 1, wherein the first user operation comprises a slide on the touch panel.

5. The information processing device according to claim 1, further comprising a hardware key configured to receive the second user operation.

6. The information processing device according to claim 1, wherein an appearance of the first indicator is different from an appearance of the second indicator.

7. The information processing device according to claim 1, wherein after the first indicator is displayed, if no tap at the first indicator is detected within a first time period, then a state of the information processing device transitions to a state in which nothing is displayed on the display.

8. An information processing method comprising:

when an information processing device in a locked state receives a first user operation:

gradually displaying, on a display configured to display a plurality of indicators each associated with at least one of a plurality of application programs, a first indicator associated with a first application program in response to receiving the first user operation; and executing the first application program in response to detecting a tap at the first indicator;

when the information processing device in the locked state receives a second user operation:

displaying an interface for receiving information for unlocking in response to receiving the second user operation;

displaying a second indicator associated with a second application program in response to receiving the information for unlocking; and executing the second application program in response to detecting a tap at the second indicator;

wherein the first application program and the second application program are the same program, wherein a background image when the first indicator is displayed is different from a background image when the second indicator is displayed, wherein the background image when the first indicator is displayed is different from a background image when the interface for receiving the information for unlocking is displayed, and wherein the first indicator is user-configurable.

9. The information processing method according to claim 8, wherein an appearance of the first indicator is different from an appearance of the second indicator.

10. The information processing method according to claim 8, wherein after the first indicator is displayed, if no tap at the first indicator is detected within a first time period, a state of the information processing device transitions to a state in which nothing is displayed on the display.

11. A non-transitory storage medium storing a program that, if executed, causes an information processing device to perform an information processing method comprising:

when the information processing device in a locked state receives a first user operation:

gradually displaying, on a display configured to display a plurality of indicators each associated with at least one of a plurality of application programs, a first indicator associated with a first application program in response to receiving the first user operation; and executing the first application program in response to detecting a tap at the first indicator;

when the information processing device in the locked state receives a second user operation:
  displaying an interface for receiving information for unlocking in response to receiving the second user operation;
  displaying a second indicator associated with a second application program in response to receiving the information for unlocking; and
  executing the second application program in response to detecting a tap at the second indicator;
wherein the first application program and the second application program are the same program,
wherein a background image when the first indicator is displayed is different from a background image when the second indicator is displayed,
wherein the background image when the first indicator is displayed is different from a background image when the interface for receiving the information for unlocking is displayed, and
wherein the first indicator is user-configurable.

12. The non-transitory storage medium according to claim 11, wherein an appearance of the first indicator is different from an appearance of the second indicator.

13. The non-transitory storage medium according to claim 11, wherein after the first indicator is displayed, if no tap at the first indicator is detected within a first time period, a state of the information processing device transitions to a state in which nothing is displayed on the display.

* * * * *